US005135870A

United States Patent [19]

Williams et al.

[11] Patent Number: 5,135,870

[45] Date of Patent: Aug. 4, 1992

[54] LASER ABLATION/IONIZATON AND MASS SPECTROMETRIC ANALYSIS OF MASSIVE POLYMERS

[75] Inventors: Peter Williams; Randall W. Nelson, both of Phoenix, Ariz.

[73] Assignee: Arizona Board Of Regents, Tempe, Ariz.

[21] Appl. No.: 531,834

[22] Filed: Jun. 1, 1990

[51] Int. Cl.[5] .............................................. G01N 24/00

[52] U.S. Cl. ...................................... 436/173; 436/85; 436/86; 436/94; 436/174; 436/181; 364/497; 250/282; 250/288

[58] Field of Search ................. 436/173, 174, 181, 86, 436/85, 94; 364/300, 301; 250/288, 282

[56] References Cited

U.S. PATENT DOCUMENTS 4,243,881 1/1981 Bethune et al. .................. 250/338.1
4,674,878 6/1987 Vo-Dinh ............................ 356/301
4,802,761 2/1989 Bowen et al. ....................... 356/301
4,920,264 4/1990 Becker et al. ....................... 436/173
4,988,879 1/1991 Zare et al. .......................... 250/288

*Primary Examiner*—James C. Housel
*Assistant Examiner*—Maureen M. Wallenhorst
*Attorney, Agent, or Firm*—Richard R. Mybeck

[57] ABSTRACT

A sample containing one or more compounds of high molecular weight is analyzed by irradiating, with a pulsed laser in vacuum, a substrate coated with a thin frozen film of a solution containing the sample. The laser energy is absorbed at the surface of the substrate, rapidly heating the frozen film and ablating the solvent into a vapor plume which carries into the vapor phase entrained molecules of the sample. The vaporized molecules are ionized and accelerated into a mass spectrometer. Mass spectrometric determination of the masses of the ionized molecules of the sample allows the molecular components of the sample to be identified.

21 Claims, 2 Drawing Sheets

LASER ABLATION/IONIZATON AND MASS SPECTROMETRIC ANALYSIS OF MASSIVE POLYMERS

FIELD OF THE INVENTION

This invention relates to a method of facilitating DNA/RNA Mass Spectrometry and more particularly to a method using laser ablation, ionization and time of flight mass spectrometry to identify, by their masses, large molecules and molecular fragments in complex mixtures.

BACKGROUND OF THE INVENTION

A need exists for determining the molecular mass of high molecular weight organic molecules such as nucleic acids, proteins, oligosaccharides, and like moieties having molecular weights of 3000 daltons (Da) and more, and for polymer size determinations. Presently no accurate general method for such determinations exist.

Heretofore, the best known method for the determination of protein and nucleic acid masses is gel electrophoresis which at best has an accuracy of ±5%. Presently, the only method known for determining polymer size distribution is a gel permeation method which is recognized as imprecise and only measures relative sizes. More accurate mass spectrometric methods have been reported recently for protein mass determination, but this approach has not been extended to other polymers.

Mass spectrometric analysis of massive biopolymers such as nucleic acids, proteins, and oligosaccharides requires a means of volatilizing the molecules without fragmentation or degradation, or with controlled fragmentation, together with a means of ionizing the gas-phase molecules efficiently, again without inducing fragmentation. Slow heating of such molecules typically results in pyrolysis rather than volatilization. Thus, a number of desorption techniques have been developed which involve a very rapid input of energy into the target material, either by fast (mega-electron volt) or slow (kilo-electron volt) heavy-ion impact or by photon irradiation, to achieve desorption in a time that precludes complete degradation. Advantages are derived from dissolving the sample to be volatilized in a liquid or solid matrix, which, in the case of kilo-electron volt ion impact desorption, can act to minimize ion beam damage, or, for pulsed laser desorption, can serve as a chromophore, efficiently coupling the radiative energy into the material to be volatilized.

The present invention represents a substantial improvement over the prior art by determining molecular masses through the use of pulsed laser ablation, multiphoton ionization and time of flight mass spectrometry.

BRIEF SUMMARY OF THE INVENTION

The present invention utilizes a matrix to mediate the volatilization of large molecules and employs a pulsed laser desorption technique for biomolecules which is specifically demonstrated by the desorption of intact DNA molecules of 410,000 Daltons (Da) molecular weight. In addition, with the ablating laser tuned to a resonant frequency of certain atomic components of the sample, e.g. alkali and alkali earth metals, multiphoton ionization of these atoms is induced efficiently producing ions which attach to the volatilized sample molecules. The resulting ionized molecules can be accelerated into a mass spectrometer and identified by accurate determination of their masses.

More particularly the present invention comprises a process, in which a pulsed laser irradiating the sample stage or the sample can cause complex molecules such as nucleic acids, polymers and the like to be volatilized, intact or partially fragmented, which allows accurate determination of the mass of such intact molecular ions and/or fragments, and the identity and structure of such complex molecules to be elucidated.

Accordingly a principal object of the present invention is to provide improved means and methods for the volatilization and consequent mass spectrometric analysis of involatile, thermally labile high molecular weight compounds such as nucleic acids, carbohydrates, proteins and like biopolymers.

Another object of the present invention is to provide improved means and methods for characterizing non-biochemical polymers by mass spectrometric analysis.

Still another object of the present invention is to provide a means to control the fragmentation of volatilized large molecules, suppressing fragmentation when analysis of complex mixtures is desired, and controllably inducing fragmentation at structure-specific sites when structural information is desired for a single molecular species.

These and still further objects as shall hereinafter appear are readily fulfilled by the present invention in a remarkably unexpected manner as will be readily discerned from the following detailed description of an exemplary embodiment thereof especially when read in conjunction with the accompanying drawing in which like parts bear like numerals throughout the several views.

Figures 1A, 1B, 1C:
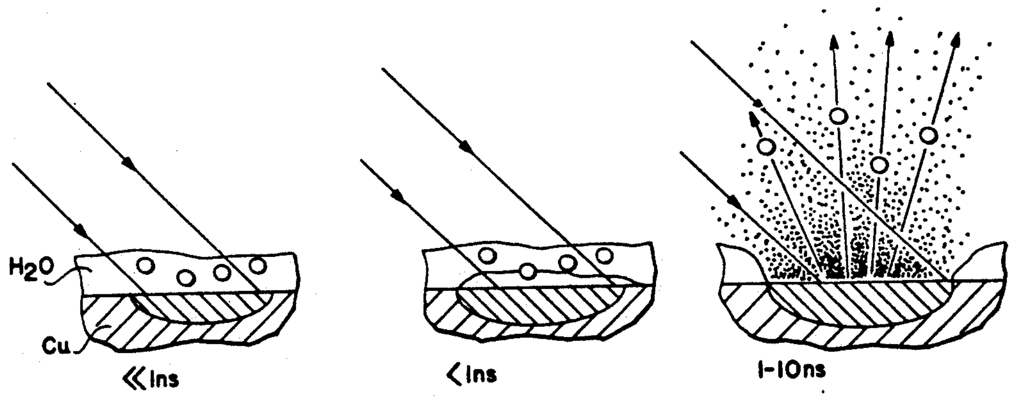
FIGS. 1A, 1B and 1C are is a graphic representation of a timed sequence in practice of the present invention.

5'-[GCTTAATTAATTAAGC]-3'
3'-[CGAATTAATTAATTCG]-5' obtained at a laser power density of about $5\times10^8$W/cm$^2$.

DESCRIPTION OF THE PREFERRED EMBODIMENTS

The present invention relates to laser ablation/ionization and mass spectrometric analysis of massive polymers. Effective laser desorption of massive molecules can be accomplished by ablating a frozen film of solution containing the molecules. The film, when ablated, produces an expanding vapor plume which entrains the intact molecules or fragments thereof.

The use of a volatile frozen solvent having a low boiling point and a low critical temperature provides several additional advantages as will be described. First, the critical temperature imposes an upper limit on the temperature attained before ablation occurs. Second, the free expansion of the ablated matrix vapor produces a substantial degree of internal cooling of the entrained macromolecules which stabilizes them against gas phase dissociation. Cooling can be extremely rapid. For example, with a laser spot size of 0.1 mm, substantial cooling occurs over a distance of about 1 mm above the surface of its substrate, in about 1 microsecond if gas velocities are about $10^3$ m/s. The matrix is further chosen for its solvent properties and for its vacuum compatibility as will hereafter appear in greater detail.

Water, the natural solvent for most biomolecules, is an appropriate solvent for use in the practice of the present invention. The vacuum compatibility of the water is assured by freezing the solution to liquid nitrogen temperature. To produce the ionization needed for mass spectrometry, it is preferable to use a laser wavelength in the visible region namely between 400 nm to about 600 nm.

The pulsed laser ablation, in vacuum, of DNA molecules from frozen aqueous solutions has been accomplished. DNA was chosen as a test material because such large nucleic acids have not previously been volatilized by desorption techniques, and because sensitive autoradiographic techniques are available to detect and characterize $^{32}$P-labeled DNA.

To verify the contents of the vapor plume created by laser ablation the laser target was a thin film of a frozen aqueous TE buffer (10 mm tris, 1 mm EDTA, pH 7.5), solution of an Msp 1 restriction enzyme digest of the Escherichia coli plasmid pBR322, containing fragments of double-stranded DNA ranging in size from 9 to 622 base pairs, or from about 7 to 410 kDa. The solution (50 to 100 microliters, 2 micrograms/mL) was smeared onto a copper cold finger which was initially cooled to −20° C. to create a thin ice film. If desired, the cold finger can be acid-cleaned before each experiment and will exhibit a bright metallic copper surface. After several days of applications, a visible thin film of corrosion (greenish-brown in color) appears on the surface of the copper substrate. Preferably, this corrosion film is left on the cold finger surface because it improved the efficiency of the ablation process as hereinafter described.

The cold finger is inserted into an ion-pumped vacuum system and cooled with liquid nitrogen while the system is evacuated to $10^{-6}$ torr. The frozen films are then irradiated in vacuum by 20-nanosecond (ns) pulses from an excimer laser-pumped dye laser operating at 581 nm (wavelength of maximum laser output for the system used) at power densities ranging from about $10^6$ to about $10^8$W/cm$^2$. The laser power density at the film surface is varied by changing the laser spot size at the target over a range of diameters between 0.15 mm and 1.5 mm using a lens with a focal length of 150 mm. The spot sizes were estimated visually after irradiation. At 581 nm both the DNA and the water are transparent, and energy deposition occurs initially in the copper substrate. Ablated material is collected on siliconized microscope slides placed 2.0 cm away from the target. After the slides are removed from the vacuum system, direct-contact autoradiograms of the collector slides are obtained.

When thin regions of the ice film (10–100 micrometers thick, estimated from the pressure pulses on the ion pump power supply), are irradiated, most of the radioactivity collected is concentrated in diffuse but strongly forward-peaked deposits characteristic of the free expansion of the vapor from the laser-ablated areas.

Subsequent polyacrylamide gel electrophoresis (PAGE) of material extracted specifically from the ablation deposits indicated that the material was fragmented to a variable degree, but that intact DNA molecules as massive as 410,000 Da had also been ablated from the starting digest.

To demonstrate the efficacy of the present invention a simple linear time of flight (TOF) mass spectrometer was constructed. A field-free drift region was created using a section of copper tubing (43 cm in length, 1 cm i.d.), the ungridded entrance of which was placed 1 cm away from the cooled sample stage. For positive ion mass spectra, the drift tube was held at an acceleration potential of −100 eV while the sample stage remained at ground potential. Terminating the drift tube was a 16-dynode electron multiplier with the first dynode held at −3.5 kV. The signal from the electron multiplier was fed through an operational amplifier (time constant about 5 microseconds) to a Tektronix model 2221 digital storage oscilloscope (200 ns/channel as used). 20 ns duration pulses from an excimer laser-pumped dye laser (Lambda Physik EMG50/FL2000) impinged on the sample at an angle about 45°–50° to the sample normal.

The laser was focussed through a lens of 20 cm focal length to a spot size on the sample which was variable in area from between about $10^{-1}$ to about $10^{-2}$ mm$^2$. The oscilloscope was triggered at the beginning of the laser pulse, and ion intensities were monitored with respect to time. Flight times at the maxima of the peaks were determined using the internal cursor of the oscilloscope. Spectra were output to an X—Y plotter. The figures were obtained by digitizing the mass spectra from the raw X-Y plots into a suitable computer (HP 9836 Hewlett-Packard), and then replotting the data (see FIGS. 2-4). The background signals between peaks in the mass spectra arose from amplifier noise. No background subtraction was performed.

Time to mass conversion was performed using an instrumental calibration equation determined from the linear regression fit of mass vs. time data obtained by the laser ablation/ionization of cesium iodide samples. Cluster ions from the cesium iodide were resolved up to $(CsI)_6Cs^+$. For these peaks, mass determination errors averaged ±0.5%, with errors stemming mainly from the broad peak shapes. Because of the long time constant of the operational amplifier, operation at the low accelerating voltage of −100V was used to achieve a mass resolving power of about 5–15 in the mass range from 1–10,000 Da. Even with this instrument limitation, resolution of molecular fragments sufficient for identification was achieved Mass spectra were also obtained from frozen cesium iodide solutions. Cesium iodide clusters were not seen above $(CsI)_2Cs^+$ in this case, nor were water clusters larger than $(H_2O)_3H^+$. The high molecular weight ions observed from frozen nucleic acid solutions were not massive water cluster ions.

The nucleic acid samples used were obtained in their sodium salt forms and diluted to about 2 micrograms/ml with a 10mM : 1 mM tris:EDTA (TE) buffer solution, pH=7.5. Approximately 40 microliters (about 8–30 picomole DNA) of the solutions were smeared onto a 1 cm$^2$ area of a pre-cooled (about 253 K) flat copper sample stage which was cooled in vacuum by means of a liquid nitrogen cold finger. Prior to application of the sample, the surface of the copper sample stage was either polished to a shiny appearance or allowed to corrode (by application of the TE buffer to the sample stage several days prior to sample preparation). After about 30 min at 253K and atmospheric pressure, the sample stage was inserted into the vacuum system and slowly pumped down with a rotary pump as the sample stage was cooled to liquid nitrogen ($LN_2$) temperature. After the sample had achieved $LN_2$ temperature, the system was evacuated with an ion pump (120 L/s) to a pressure of about $1\times10^{-6}$ torr.

During evacuation, the thin ice films slowly sublimed to achieve final thicknesses ranging from tens to hundreds of micrometers. Film thickness were estimated by monitoring the current inflections (proportional to the pressure inflections) of the ion pump power supply during laser irradiation.

Initially, mass spectra were obtained using a laser wavelength of 581 nm; this was the laser wavelength at which the maximum power output was obtained for the laser dye used (Rhodamine 6G). It was found that by tuning the laser to wavelengths in resonance with electronic transitions of sodium or copper atoms, which populated the ablated vapor plume, more intense and much more reproducible spectra were obtained. Under these conditions, ionization occurs by multiphoton ionization of the sodium or copper atoms followed by attachment of the resulting ions to the ablated biomolecules as shown in FIGS. 1A, 1B and 1C.

Figure 2:
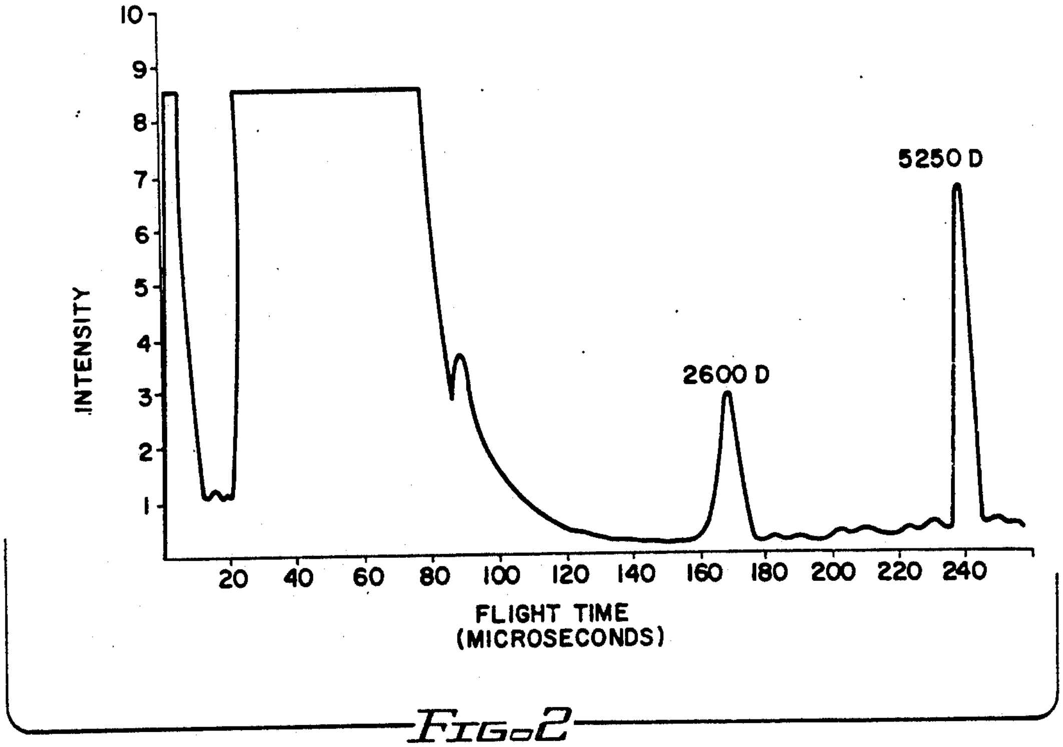
FIG. 2 is a five shot laser ablation/ionization Time of Flight mass spectrum of the single-stranded DNA oligomer dp(A)$_8$ obtained at a power density of approximately $5\times10^8$W/cm$^2$ and wavelength of 578 nm showing the parent (2600 Da) and dimer (5250 Da) molecular ions.
Figure 3:
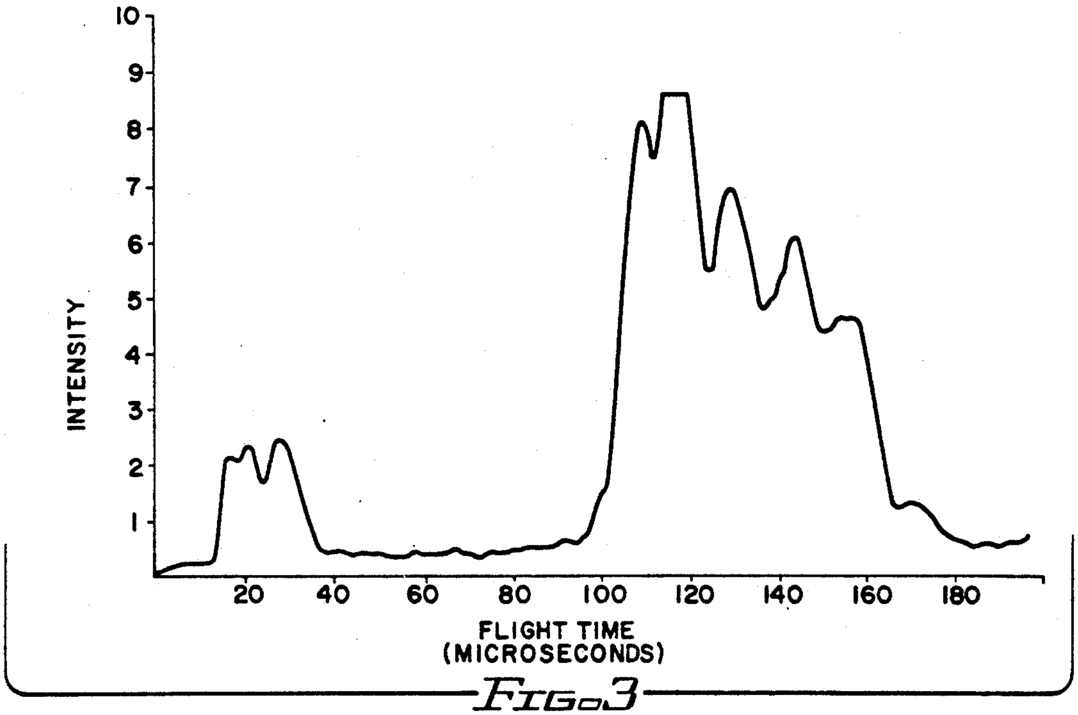
FIG. 3 is a five shot spectrum of the single-stranded DNA oligomer dp(A)$_8$, obtained at a power density of approximately $5\times10^7$W/cm$^2$ and wavelength of 589 nm showing fragmentation.
Figure 4:
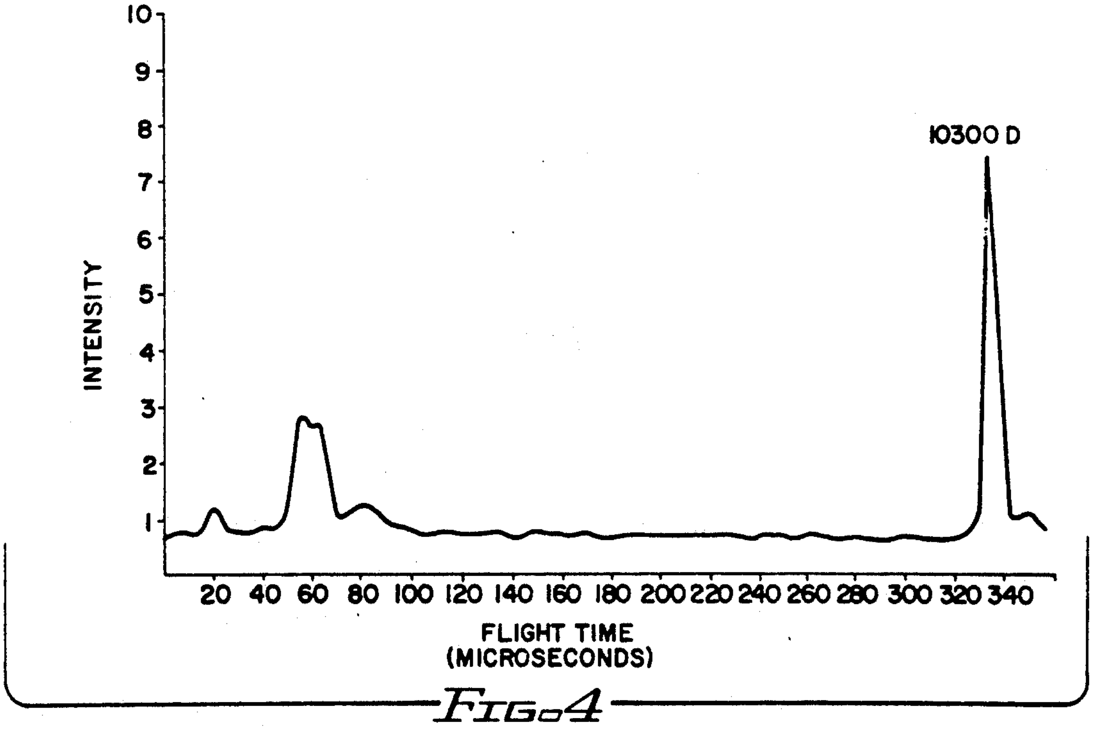
FIG. 4 is a spectrum of the double-stranded DNA oligomer

The mass spectra shown in FIGS. 2 through 4 were obtained at two different laser wavelengths, namely 578 nm and 589 nm. At 578 nm, atomic sodium exhibits a resonant 2-photon electronic transition and atomic copper exhibits a resonant one-photon transition and irradiation at this wavelength increased the ionization efficiency of the molecular species. Similarly, sodium exhibits a resonant 1-photon electronic transition at 589 nm. By tuning the laser to this wavelength, molecular ion signals of comparable intensities and reproducibility to those obtained at 578 nm are obtained. Compared to the spectra obtained at off-resonant wavelengths such spectra exhibited an increase in molecular ion intensities of about an order of magnitude. The ratio of parent molecules to fragments was previously observed to be dependent on the laser power density and the absorptivity of the copper substrate, each of which has influence on the substrate heating rate. In the wavelength range 578–589 nm, the absorptivity (A) of polished copper is about 0.3, and increases to about 0.9 for a corroded surface. All spectra presented here were obtained from samples applied to an corroded (A about 0.9) sample stage, which, at a laser power density of $5\times10^8$W/cm$^2$, produced the highest ratio of parent to fragment ions.

As stated earlier, the resolving power of the mass spectrometer used was limited to 5–15. The large width of the parent and fragment peaks arises primarily from the limitations of the amplifier used. Not only does the long time constant of this amplifier (about 5 microseconds) lead to intrinsically broad peaks, but also the long time constant dictated operation at a low accelerating voltage of −100V, exacerbating the effects of initial kinetic energies of the ions.

FIG. 2 is a mass spectrum (sum of 5 laser shots) of the single-stranded DNA oligonucleotide pd$(A)_8$, laser ablated/ionized from frozen aqueous solution at a laser power density of $5\times10^8$W/cm$^2$ and wavelength of 578 nm. Peaks are observed at masses 2600 and 5250 Da, which were identified as the parent monomer and dimer, pd$(A)_8$+ and 2(pd$(A)_8$)+, respectively (MW=2,720 D for the sodium salt of the molecule). A shift to lower masses should result if the ions acquire kinetic energies of a few eV, corresponding to expansion velocities of a few hundred meters/second. Intense ion signals are also present in the mass region form about 50 to 600 Da, presumably derived from multiple fragmentation of the parent molecule.

FIG. 3 shows a 5 shot accumulation mass spectrum of single stranded DNA oligomer pd$(A)_8$ at a laser wavelength of 589 nm, and a power density of $5\times10^7$ w/cm$^2$. Peaks indicating partial fragmentation of the parent molecule are seen. The peaks shown are consistent with removal of consecutive pd(A) nucleotide units from the parent molecule. Fragment ions of this sort were typically observed at a laser power density less than $1\times10^8$W/cm$^2$. The relationship between laser power density and the degree of fragmentation is inverse. The nucleic acid is transparent in the wavelength region used, so little direct excitation of the molecules should occur. It is believed that fragmentation occurs in a transient high temperature liquid phase as the solutions are heated to a temperature (limited by the critical temperature of the $H_2O$ matrix, 647K) sufficient for ablation to begin. Once expansion of vapor begins, cooling occurs, effectively quenching the fragmentation process. Reducing the power input by a factor of 10 lengthens the heating time by a factor of 100, allowing more time for fragmentation in the liquid phase. The absence of a continuous background signal, which would arise from unimolecular dissociation in the acceleration region, is consistent with the idea that fragmentation occurs solely in the liquid phase.

FIG. 4 shows a mass spectrum obtained by laser ablation/ionization of the double-stranded DNA oligomer,

5'-[GCTTAATTAATTAAGC]-3'
3'-[CGAATTAATTAATTCG]-5'.

The mass spectrum was obtained using a laser power density of about $5\times10^8$W/cm$^2$, and a laser wavelength of 589 nm, and shows a parent molecular ion signal at mass 10,300 Da. In the low mass region, a peak corresponding to Na+ is observed. Signals are observed in the mass region 280 to 390 Da, stemming from fragmentation of the sample molecules. The calculated mass for the parent molecule (sodium salt, cationized with Na+) is 10,619 Da.

Typically, a molecular ion signal is observed from a given target area for a duration of 1–3 laser pulses, after which only Cu+ and Na+ are observed. Signals due to molecular fragmentation, and H+ and $(H_2O)_nH^+$ clusters also disappear after a few laser shots. During acquisition of multiple-shot spectra, the sample stage is moved between each laser shot to expose fresh material. For each analysis a total of between 8–30 pmol of nucleic acid is applied to the substrate. Assuming uniform coverage over the 1 cm$^2$ sample area, the total number of molecules desorbed per pulse was approximately $10^8$–$10^9$ (spot area $10^{-2}$–$10^{-1}$ mm$^2$), so that only a few femtomoles (tens of picograms) of nucleic acid were removed to obtain each 5 shot spectrum. Since the sample received no treatment other than freezing, unablated sample can be readily recovered when desired.

As will appear, the above described techniques are not limited to the nucleic acids or proteins. The laser ablation of polymers from films of frozen solutions as described herein allows the determination of polymer size distribution per se. Thus, any polymer candidate can be dissolved in a volatile organic solvent, such as benzene or toluene, frozen onto a liquid nitrogen-cooled cold finger, and thereafter ablated with a pulsed laser into a time-of-flight mass spectrometer. By coating the substrate with a compound containing a readily ionizable metal such as sodium, or other alkali or alkaline earths, and tuning the laser to the appropriate resonant transitions such as 578 or 589 nm, for sodium, or by tuning the laser to a resonant transition in atoms of the substrate material such as 578 nm for copper, ions are produced which attach to the ablated polymer molecules to allow mass spectrometric separation. The difficulty of ionizing hydrocarbon polymer molecules, which are not intrinsically ionized in the solid phase, has previously presented a major impediment to polymer mass spectrometry. The mass measurement is absolute, in contrast to gel permeation; mass range should be at least 300,000 daltons, encompassing many commercial polymers; and accuracy of mass determination is better than 0.01%, far better than gel permeation.

The pulsed laser ablation of frozen aqueous solutions as described herein offers a unique volatilization technique for bimolecular and polymer mass spectrometry. Given the production of vapor-phase molecules, mass spectrometry requires, in addition, ionization, mass analysis, and detection steps. The process of resonant multiphoton ionization of atoms in the ablated plume, followed by attachment of these ions to the ablated molecules is a new and important process which considerably simplifies mass spectrometry of ablated massive molecules. Mass analysis by time-off-light techniques has a mass range limited only by the ability to detect massive molecular ions. Such detection is vastly improved by creating more ions in a given laser pulse, using the multiphoton ionization and attachment process of the present invention. The varying degree of fragmentation evident in the DNA mass distributions results from the different rates of energy input into the matrix which may be controllably induced by varying the laser power density. Because small oligonucleotides undergo thermal fragmentation preferentially at the phosphodiester linkage, direct acquisition of sequence information in the mass spectrometer is now possible.

Time of flight mass spectra of single and double-stranded oligomeric nucleic acids, at masses up to 10,600 Da, have been shown. Volatilization is accomplished by pulsed laser ablation of frozen aqueous solutions of the sample at laser wavelengths of 578 and 589 nm. Fragmentation was increased when the rate at which energy was deposited in the substrate was reduced by lowering laser power density. It is therefore possible to obtain sequence information directly for small single-stranded oligonucleotides by determining the masses, and therefore the identities, of individual nucleotides split off sequentially from the terminus of an oligonucleotide chain.

From the foregoing, it becomes apparent that means and methods have been herein described and illustrated which fulfill all of the aforestated objectives in a remarkably unexpected fashion. It is of course understood that such modifications, alterations and adaptations as may readily occur to an artisan having the ordinary skills to which this invention pertains are intended within the spirit of the present invention which is limited only by the scope of the claims appended hereto.

Accordingly, what is claimed:

1. A method of analyzing an organic sample containing one or more compounds of high molecular weight comprising: selecting an organic sample containing one or more high molecular weight compounds; dissolving said sample in a solvent to form a solution; dissolving in said solution a soluble compound containing atoms of one or more metals having a low ionization potential; cooling a sample state and depositing said solution on a surface of said sample stage to form a frozen thin film of said solution on said sample stage; placing said film-coated sample stage in a chamber and evacuating said chamber to high vacuum while maintaining said film in a frozen state; exposing said film to a laser pulse at a wavelength absorbed efficiently by the sample stage, said laser pulse rapidly heating the surface of said sample stage to ablate said film and create a plume of solvent vapor containing intact molecules of the organic sample and metal atoms; tuning said laser pulse to wavelengths coincident with resonant electronic transitions in said metal atoms in said vapor plume to create ions of said metal atoms by multiphoton ionization during the laser pulse, said ions of the metal atoms attaching to said molecules of the organic sample to form molecular ions; and accelerating said molecular ions into a mass spectrometer to determine the masses of said molecular ions, and identify the molecular components of said organic sample.

2. A method according to claim 1 in which said laser pulse is delivered at an energy level of from about $2\times10^7 W/cm^2$ up to about $2\times10^8 W/cm^2$.

3. A method according to claim 2 in which said metal atoms are selected rom the group consisting of alkali and alkaline earth metals.

4. A method according to claim 3 in which said laser pulse is at a wavelength not absorbable by said solution.

5. A method according to claim 2 in which said sample stage is coated with metal atoms responsive to multiphoton ionization independently of depositing said film of solution thereupon.

6. A method according to claim 5 in which said laser pulse is at a wavelength not absorbable by said solution.

7. The method of claim 6 in which said metal atoms are selected from the group consisting of alkaline and alkaline earth metals.

8. A method according to claim 2 in which said laser pulse is at a wavelength not absorbable by said solution.

9. The method of claim 8 in which an ionizable metal is dispersed within said solution prior to forming said frozen film.

10. The method of claim 8 in which the surface of the sample stage comprises an ionizable metal.

11. A method according to claim 1 in which said solvent is water.

12. A method according to claim 1 in which said metal atoms are selected from the group consisting of alkali and alkaline earth metals.

13. A method according to claim 12 in which said sample stage is coated with metal atoms responsive to multiphoton ionization independently of depositing said film of solution thereupon.

14. A method according to claim 13 in which said laser pulse is at a wavelength not absorbable by said solution.

15. A method according to claim 14 in which said laser pulse is delivered at an energy level of from about $2\times10^{7}W/CM^{2}$ up to about $2\times10^{8}W/CM^{2}$.

16. A method according to claim 15 in which said solvent is water.

17. A method according to claim 12 in which said laser pulse is at a wavelength not absorbable by said solution.

18. A method according to claim 1 in which said sample stage comprises metal atoms responsive to multi-photon ionization.

19. A method according to claim 18 in which said laser pulse is at a wavelength not absorbable by said solution.

20. The method of claim 19 in which said metal atoms are selected from the group consisting of alkaline and alkaline earth metals.

21. A method according to claim 1 in which said laser pulse is at a wavelength not absorbable by said solution.

* * * * *